United States Patent [19]

Robinson

[11] 4,071,609

[45] Jan. 31, 1978

[54] METHOD FOR PREPARING PARTICULATE ZINC OXIDE SHAPES OF HIGH SURFACE AREA AND IMPROVED STRENGTH

[75] Inventor: Victor S. Robinson, Brooklyn Heights, N.Y.

[73] Assignee: The New Jersey Zinc Company, Bethlehem, Pa.

[21] Appl. No.: 594,391

[22] Filed: July 9, 1975

[51] Int. Cl.$^2$ ................................................ C01G 9/02
[52] U.S. Cl. ...................................... 423/622; 423/244
[58] Field of Search ........................ 423/419, 622, 244

[56] References Cited

U.S. PATENT DOCUMENTS

| 1,878,390 | 9/1932 | Franklin | 423/544 |
|---|---|---|---|
| 1,944,415 | 1/1934 | Engberg | 423/419 |
| 2,727,808 | 12/1955 | Thomsen | 423/622 |
| 2,898,191 | 8/1959 | Conn et al. | 423/622 |
| 2,956,861 | 10/1960 | Garlet | 423/622 |
| 3,441,370 | 4/1969 | Gutmann et al. | 423/245 |
| 3,674,476 | 7/1972 | Tamai et al. | 423/622 |

FOREIGN PATENT DOCUMENTS

| 45-36,211 | 11/1970 | Japan | 423/419 |
|---|---|---|---|
| 46-34,401 | 10/1971 | Japan | 423/622 |

*Primary Examiner*—O. R. Vertiz
*Assistant Examiner*—Wayne A. Langel
*Attorney, Agent, or Firm*—Gregory J. Battersby; T. E. Harrison, Jr.; Bruce E. Hosmer

[57] ABSTRACT

Particulate zinc oxide shaped of high surface area and improved crushing strength are prepared without extraneous binder by a process including forming normal surface area zinc oxide into shapes without binder, converting at least a portion of the zinc oxide to basic zinc carbonate by exposing the shapes in the presence of moisture, to a carbon dioxide-containing atmosphere and effecting substantially complete decomposition of the basic zinc carbonate. Conditions of bulk density, moisture content and temperature are controlled.

9 Claims, No Drawings

METHOD FOR PREPARING PARTICULATE ZINC OXIDE SHAPES OF HIGH SURFACE AREA AND IMPROVED STRENGTH

BACKGROUND OF THE INVENTION

Catalysts are employed in a variety of chemical processes such as synthesis and reforming of hydrocarbons, ammonia synthesis, etc. Many such catalysts consist of or contain metallic, i.e., nickel, iron, copper, chromium, etc., compounds which may be either temporarily deactivated or permanently poisoned by certain contaminants or components in a process stream. Prominent among the permanent poisons are hydrogen sulfide and various organic sulfur compounds. With such catalysts it is essential that the sulfur be removed from the process stream to prevent contact with such catalysts.

Various methods for removing sulfur have been proposed and several are in current use including washing with sulfuric acid, adsorption on activated carbon and absorption or chemisorption by various materials. With high-sulfur feedstocks, a combination of desulfurizing methods is sometimes employed.

A material found to be particularly effective in reducing sulfur in process streams to an acceptable level, is zinc oxide. In U.S. Pat. No. 1,868,096 the process disclosed includes passing a stream of water gas over one or more masses composed of zinc oxide or zinc oxide and chromium oxide before contact with a methanol catalyst which is sensitive to sulfur poisoning. When used as a desulfurant, zinc oxide is converted to zinc sulfide. The active life of a charge of zinc oxide in a desulfurizing reactor is obviously dependent upon the sulfur content of the feedstock being processed. Nevertheless, maximum utilization of the zinc oxide itself is also of importance. In that regard, the availability of the zinc oxide for the desulfurizing reaction and the quantity of zinc oxide that can be contained within an available reactor volume have important effects upon the active life of the zinc oxide charge.

The amount of normal zinc oxide that can be contained in a given volume depends upon its purity and its bulk density. A product of low purity has an inherent disadvantage in that inactive impurities will occupy a portion of the reactor volume in more or less direct proportion to their percentage in the zinc oxide product. Hence, a normal zinc oxide of high purity is most desirable. The weight that can be charged into a reactor is directly related to its bulk density, that is, the weight of a given volume of product. Light, fluffy zinc oxides are at a stoichiometric disadvantage in that relatively small weights of such products will occupy the available reactor volume.

The availability of the zinc oxide for reaction with hydrogen sulfide and other sulfur-containing compounds is a function of its specific surface area, that is, the surface area of one gram of solid; at times, this is referred to simply as surface area. It is known that solids in the form of fine particles exhibit larger specific surface areas and greater reactivity than those of greater particle size and that solids can be produced in an "active" or highly dispersed state by thermal decomposition of a parent substance from which a volatile component is released. In U.S. Pat. No. 1,878,390 relating to the preparation of catalysts suitable for methanol production, it is disclosed that catalysts comprising zinc oxide or a mixture of zinc oxide and chromium oxide are particularly effective when prepared by heating the basic carbonates. The preparation of a highly reactive zinc oxide of exceedingly small particle size by the heating of ammoniated zinc carbonate is disclosed in U.S. Pat. No. 2,898,191 and Russian Pat. No. 308,976. The advantages of controlling the surface area of zinc oxide for use in removing sulfur compounds from industrial gas streams wherein steam is admixed is disclosed in U.S. Pat. No. 3,441,370; zinc oxides having surface areas above 30 square meters per gram are said to be of particular advantage. The preparation of these high surface area zinc oxides is by a wet process including precipitation of zinc carbonate followed by calcination for conversion to zinc oxide.

Although high specific surface area is a prime requisite of the zinc oxide intended for use in desulfurizing industrial gas streams, it is equally important that the zinc oxide be in a form suitable for charging into reactor towers. The physical form should be such that adequate resistance to handling, rather rough at times as in shipping, is provided. High bulk density is also desired in order that an adequate weight can be packed into a reasonable volume. Since the latter is at variance with the requirement of high surface area for availability and reactivity, in that exceedingly finely divided solids are usually of low bulk density, agglomeration of high surface area products into a form suitable for charging into desulfurizing reactors is required. Various methods of agglomeration have been proposed including forming a paste and extruding it into cylinders which can be cut to desired lengths, forming tablets in a press, forming spherical pellets either in rotating drums or on rotating discs, etc. Normally an appreciable proportion of a binding material is required for adequate strength, particularly with high surface area zinc oxide, whereby the zinc oxide content is proportionately reduced. Optimum life of a zinc oxide product intended for use in desulfurizing industrial gas streams requires consideration of all of these factors.

SUMMARY OF THE INVENTION

It has now been discovered that particulate zinc oxide shapes with excellent physical properties and a high capacity for absorption of hydrogen sulfide can be prepared without a binder by a process which includes the steps of forming normal zinc oxide having a normal surface area into shapes of a size dependent upon the requirements of the intended use, effecting conversion of at least a portion of the normal zinc oxide to basic zinc carbonate ($5ZnO \cdot 2CO_2 \cdot 3H_2O$) by exposure of the normal zinc oxide shapes in the presence of moisture to an atmosphere containing carbon dioxide and subsequently effecting decomposition of the basic zinc carbonate to zinc oxide.

The results achieved by this process are quite unexpected in that not only is the surface area of the normal zinc oxide increased but the strength and hardness of these shapes, produced without extraneous binder of any kind, surpass those of most configurations of similar high surface area zinc oxide produced with a binder. Additionally, the shapes produced by this process do not dust, an important consideration since gas flow, through a bed of zinc oxide which dusts, can be seriously impeded. The product of the present invention has also been found to be more effective in removing sulfur than presently available commercial products.

PREFERRED EMBODIMENT

A normal zinc oxide having a specific surface area of less than about 10 square meters per gram is first formed into shapes. The size of these shapes is determined by the equipment in which they will be used. The zinc oxide shapes may have a moisture content of up to about 30% $H_2O$ preferably about 20 to about 25% $H_2O$. The zinc oxide shapes are then exposed to an atmosphere containing about 40 to 100% $CO_2$ and about 0 to about 60% $H_2O$ at a temperature of about 50° to about 90° C preferably about 90 to about 100% $CO_2$, about 0 to about 10% $H_2O$ and about 60° to 75° to 75° C. The shapes are exposed to these conditions for up to about 4 hours. The resulting shapes contain at least about 30% basic zinc carbonate ($5ZnO \cdot 2CO_2 \cdot 3H_2O$) and preferably at least about 55% basic zinc carbonate. The basic zinc carbonate shapes are then heated in the ambient atmosphere at a temperature of about 200° to 500° C to effect substantially complete decomposition to zinc oxide. Temperatures of about 250° to 350° C are preferred. The decomposition of basic zinc carbonate to zinc oxide is endothermic. The rate at which heat is supplied will therefore affect the time required to complete the reaction. In general, about 1 to about 5 hours are required.

The zinc oxide content of the thus treated zinc oxide shapes depends almost entirely on the purity of the starting normal zinc oxide in that the addition of extraneous binding agents is not required. With normal zinc oxides, entirely satisfactory starting materials, the resulting shapes contain at least about 95% zinc oxide, preferably in excess of 98% zinc oxide. These treated shapes have a specific surface area greater than about 30 square meters per gram. The crush strength of the treated shapes is about 5 to about 30 times greater than that of the untreated shapes and generally at least about 1500 grams.

The increase in the surface area of the zinc oxide resulting from the process of the present invention depends primarily upon the extent to which the starting zinc oxide is converted to basic zinc carbonate. Surface areas are determined by methods including measurement of the quantity of a gas that is adsorbed on the surface of a sample and calculation of the total surface area of the particular sample from the adsorption data obtained. Samples may contain particles of various sizes and various surface areas, therefore, the values obtained represent an average. The effect of conversion, from normal zinc oxide to basic zinc carbonate, on surface area will be seen in Table I.

TABLE I

| % Conversion Normal ZnO to BZC* | Surface Area** (square meters per gram) |
| --- | --- |
| 76 | 50 |
| 74 | 46 |
| 66 | 43 |
| 50 | 38 |
| 36 | 27 |
| 21 | 14 |
| 0 | 4 |

*BZC = Basic Zinc Carbonate.
**Surface area of carbonated product after heating at 350° C for 1 hour to effect decomposition to zinc oxide.

As indicated previously, the surface area values represent an average for a particular sample. In the case of the product of the present invention, the surface area of zinc oxide which is not converted to basic zinc carbonate will remain substantially unchanged, while the surface area of the normal zinc oxide that is converted to basic zinc carbonate will be increased manyfold. In order to obtain products having surface areas greater than about 30 square meters per gram (sq.m./gm.), conversions of zinc oxide to basic zinc carbonate of at least about 45% are required. Similarly, as shown in Table I in order to obtain a surface area of about 50 square meters per gram (sq. m./gm.), conversion of at least about 76% normal zinc oxide to basic zinc carbonate is required. However as will be seen later, the surface area of the zinc oxide shapes also depends to a great extent upon the conditions under which the basic zinc carbonate is decomposed to zinc oxide.

The extent to which the normal zinc oxide can be converted to basic zinc carbonate depends upon the structure and bulk density of the starting normal zinc oxide shapes subjected to carbonation as well as the conditions under which the carbonation reaction is effected. The structure of the shapes should be such that adequate permeability to the carbon dioxide-containing atmosphere is provided. In that regard, compression or densification, particularly of the surface of the shapes, resulting in outer layers or shells of low porosity should be avoided. The bulk density of the starting shapes is also of importance in that the degree of conversion of normal zinc oxide to basic zinc carbonate varies inversely with the bulk density of the normal zinc oxide shapes. In Table II, the bulk density of normal zinc oxide shapes and the percent conversion to basic zinc carbonate of such shapes under substantially identical carbonation conditions are given.

TABLE II

| Bulk Density Starting ZnO Shapes (lb. per cu. ft.) | % Conversion ZnO to Basic Zinc Carbonate |
| --- | --- |
| 47 | 76 |
| 56 | 63 |
| 59 | 66 |
| 62 | 55 |
| 71 | 36 |
| 72 | 33 |
| 84 | 31 |

While shapes of low bulk density allow for higher conversions to basic zinc carbonate, such shapes do not generally possess adequate strength. Additionally, the bulk density of the final product is directly related to that of the starting shapes in that an increase of about 5 to about 15% is realized in the course of the process of the present invention. However, since the degree of conversion varies inversely with bulk density and since surface area as seen in Table I is dependent on the degree of conversion, an upper limit in bulk density of about 90 lb. per cubic foot is apparent from the data in Table II. Similarly, it is preferred that the resultant zinc oxide product should have a bulk density of at least about 50 pounds per cubic foot. The preferred starting range is about 55 to 65 pounds per cubic foot which results in a bulk density in the order of about 60 to 70 pounds per cubic foot for the product.

The conditions under which the carbonation reaction is effected must be such that basic zinc carbonate ($5ZnO \cdot 2CO_2 \cdot 3H_2O$) rather than normal zinc carbonate ($ZnCO_3$) is formed. The latter results in products of low surface areas probably due, at least in part, to the higher temperatures required to convert it to zinc oxide. Among the reaction conditions found suitable for the formation of basic zinc carbonate are a flow of carbon dioxide at about normal pressure, temperatures of about 50° to 90° C and reaction time of about 1 to 4 hours.

Conversion temperatures in excess of about 75° C result in an appreciable decrease in the rate of the reaction and should be avoided. Basic zinc carbonate obviously requires water and in that regard, the effect of water vapor concentration in the carbon dioxide upon the conversion of zinc oxide to basic zinc carbonate is presented in Table III, wherein it will be seen that desired levels of conversion starting with dry shapes, can be attained provided sufficient moisture is available in the carbon dioxide atmosphere. However, the levels of moisture in the carbon dioxide atmosphere required with dry shapes result in problems with condensation in the carbonation reactor. Additionally, forming normal zinc oxide into shapes of a desired configuration is more easily effected with addition of some water.

TABLE III

| Bulk Density ZnO Shapes* (lbs. per cu. ft.) | % $H_2O$ in Shapes | Carbonation Atmosphere % $H_2O$ | Carbonation Atmosphere % $CO_2$ | % Conversion ZnO to Basic Zinc Carbonate |
|---|---|---|---|---|
| 56 | 0 | 50 | 50 | 62 |
| 53 | 8 | — | 100 | 30 |
| 53 | 8 | 22 | 78 | 64 |
| 62 | 14 | — | 100 | 46 |
| 60 | 17 | — | 100 | 60 |
| 57 | 23 | — | 100 | 73 |
| 59 | 22 | 20 | 80 | 74 |
| 50 | 29 | — | 100 | 69 |
| 50 | 29 | 20 | 80 | 50 |

*Pellet shapes dried before bulk density determination.

Under the above circumstances, shapes containing in excess of about 15% moisture are preferred. The moisture content should not be such that the physical properties of the shapes are impaired. In the event that the required amount of moisture cannot be incorporated into the normal zinc oxide during the shaping operation, additional moisture may be introduced onto the shapes by spraying. In one such case, shapes containing about 8% moisture were sprayed with water to increase the moisture content to about 22%; the degree of conversion to basic zinc carbonate in dry $CO_2$ after 2 hours was thereby increased from about 30% to slightly above 70%.

The conditions under which the decomposition of the basic zinc carbonate is effected are also of importance. In order to effect the conversion to zinc oxide in a reasonable time, i.e., about 1 to 2 hours, temperatures of at least about 300° to 350° C have been found necessary. In Table IV the effect of temperature upon the surface area of shapes that had been 69% converted to basic zinc carbonate is set forth.

TABLE IV

| Temp. ° C | % Loss in Weight | Surface Area (square meters per gram) |
|---|---|---|
| 325 | 19.6 | 53 |
| 350 | 19.4 | 44 |
| 375 | 19.6 | 36 |
| 400 | 19.8 | 32 |

The weight losses indicate that the decomposition of the basic zinc carbonate was substantially complete in each case. As temperature increased, the surface area decreased significantly. Excessive temperature can seriously affect not only the increase in surface area but also the crushing strength of the shapes produced according to this invention as can be seen in Table V.

TABLE V

| Temperature* (° C) | Average Crushing Strength** (gm) | Surface Area (square meters per gram) |
|---|---|---|
| 300 | 2710 | 44 |
| 350 | 1910 | 35 |
| 400 | 1720 | 24 |
| 450 | 1710 | 20 |
| 500 | 1580 | 16 |
| 550 | 1090 | 11 |
| 600 | 400 | 7 |

*The samples were heated for 5 hours at the indicated temperature. This was to accelerate the affect of temperature over the preferred 1 to 2 hours shown in Table IV.
**The method used to determine the crushing strength of individual shapes is described in the following example. Ten trials were used to calculate an average crushing strength.

EXAMPLE

Approximately 40 lb. of an American process normal zinc oxide analyzing about 99% ZnO and having a surface area of about 4 square meters per gram was formed into −4, +6 mesh pellets on a 39 inch diameter pelletizing disc. The pelleting conditions were:

| ZnO Feed Rate | — | Approx. | 1.6 lb./min. |
|---|---|---|---|
| Water Spray | — | " | 0.37 lb./min. |
| Disc Speed | — | " | 17 rpm. |
| Disc Angle | — | " | 55 to 60° |

The pellets containing 17% $H_2O$ and had a moist bulk density of 72 lb. per cubic foot (dry bulk density — 60 lb. per cubic foot).

A portion of these pellets was treated with 4 liters per minute of $CO_2$ for three hours in a 4 inch i.d. ×24 inch long porcelain thimble, preheated to 60° C in a rotary furnace operated at 1 rpm. Within 20 minutes, the temperature rose to 80° C, indicating a rapid conversion of the zinc oxide to basic zinc carbonate, an exothermic reaction. Thereafter, for the next 55 minutes, the temperature slowly decreased to about 60° C and for the remainder of the run was maintained between about 60° C and about 70° C. At the end of 3 hours, conversion of the normal zinc oxide to basic zinc carbonate was about 52%. To effect decomposition of the basic zinc carbonate, the carbonated pellets were heated in a tray in a muffle furnace for about 2 hours at 325° to 350° with an air flow of about 2 liters per minute. The surface area of the final product was 30 square meters per gram; bulk density was 64 lb. per cubic foot.

The crushing strength of the pellets at various stages in the process was determined by placing a single pellet between a rigid, stationary, metal rod and the pan of a double-beam balance. An upward force was applied to the bottom of the pellet by adding weights to the opposite pan until the pellet was crushed against the metal rod. The results of 10 such trials for each type of pellet are recorded in Table VI. It will be noted that the carbonated pellets exhibit a crushing strength about 40 times greater than that of the starting pellets and that 70 to 80% of that strength is lost when decomposition of the basic zinc carbonate is effected, probably because of the increase in porosity occasioned by the evolution of carbon dioxide and water vapor. Nevertheless, the strength of the product of this invention is still twice that of a present commercial product.

TABLE VI

| Pellets at Process Stage Indicated | Crushing Strength (gm) Average |
|---|---|
| 1. ZnO Pellets from Disc (17% $H_2O$) | 150 |
| 2. ZnO Pellets dried at 110° C | 310 |
| 3. After 52% Conversion to BZC | 5660 |
| 4. After Decomposition of BZC | 1620 |
| Commercially Available ZnO Pellets | 820 |

The effectiveness in sulfur removal of the product of the present invention was compared with that of a commercially available product and also with that of uncarbonated zinc oxide pellets by passing a dry nitrogen gas stream into which hydrogen sulfide was admixed through identical beds of each type of pellet. In order to reduce the time required for these tests, the hydrogen sulfide concentration was set at 15,000 ppm, bed temperature was 340° C, and the gas flowed at a space velocity of 1260 hr.$^{-1}$. The effluent gas was monitored for hydrogen sulfide. When the hydrogen sulfide concentration in the effluent gas exceeded 1 ppm, the pellet bed was considered to have ceased to function effectively. In Table VII wherein the results of these tests are recorded, it will be seen that the product of this invention is superior not only to normal ZnO pellets but also to commercial material presently for this purpose.

TABLE VII

| Description | Surface Area (sq.m./gm.) | Bulk Density (lb./cu.ft.) | Time to >1 ppm $H_2S$ in Effluent Gas (hr.) |
|---|---|---|---|
| Normal ZnO Pellets | 5 | 60 | 0.5 |
| ZnO Product This Invention | 31 | 64 | 3.7 |
| Commercial ZnO Product | 33 | 65 | 2.1 |

In fact, the product of the present invention is almost twice as effective as the commercially available product, a difference far in excess of that which might be expected from the fact that the ZnO content of the commercial product is about 85% as compared to about 99% ZnO for the product of the present invention.

Although specific embodiments of the invention have been described and shown, it is to be understood that they are meant to be illustrative only and not limiting. Certain features may be changed without departing from the spirit or essence of the invention. It is apparent that the present invention has broad application. Accordingly, the invention is not to be construed as limited to the specific embodiments illustrated but only as defined in the following claims:

What is claimed is:

1. A process for producing high surface area and high crush strength particulate zinc oxide shapes, said process comprising:
   a. forming normal zinc oxide having a specific surface area less than 10 square meters per gram into predetermined shapes without the addition of extraneous binding material;
   b. exposing said normal zinc oxide shapes to a carbon dioxide-containing atmosphere including water vapor;
   c. converting at least about 45% of said zinc oxide into basic zinc carbonate; and
   d. decomposing substantially all of said basic zinc carbonate into particulate zinc oxide shapes.

2. The process according to claim 1 wherein said normal zinc oxide shapes contain up to about 30% water.

3. The process according to claim 1 wherein said normal zinc oxide shapes have a bulk density between about 45 and about 85 lb. per cubic foot.

4. The process according to claim 1 wherein said normal zinc oxide shapes are exposed to said carbon dioxide-containing atmosphere at temperatures between about 50° and about 90° C for between about 1 and about 4 hours.

5. The process according to claim 1 wherein said carbon dioxide-containing atmosphere comprises at least about 60% carbon dioxide.

6. The process according to claim 1 wherein said carbon dioxide-containing atmosphere comprises between about 90 and 100% carbon dioxide and between about 0 and about 10% water vapor.

7. The process according to claim 1 wherein said basic zinc carbonate is decomposed at a temperature between about 200° and 500° C.

8. The process according to claim 1 wherein said basic zinc carbonate is decomposed at a temperature between about 250° and about 350° C.

9. The process of claim 1 wherein said particulate zinc oxide shapes have a crushing strength between about five and about thirty times greater than the crushing strength of the predetermined zinc oxide shapes.

* * * * *